US009177502B2

(12) United States Patent
Jang et al.

(10) Patent No.: US 9,177,502 B2
(45) Date of Patent: Nov. 3, 2015

(54) BI-DIRECTIONAL SCAN DRIVER AND DISPLAY DEVICE USING THE SAME

(75) Inventors: Hwan-Soo Jang, Yongin (KR); Jin-Tae Jeong, Yongin (KR); Ki-Myeong Eom, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 882 days.

(21) Appl. No.: 13/035,824

(22) Filed: Feb. 25, 2011

(65) Prior Publication Data

US 2012/0050234 A1 Mar. 1, 2012

(30) Foreign Application Priority Data

Aug. 25, 2010 (KR) ........................ 10-2010-0082514

(51) Int. Cl.
*G06F 3/038* (2013.01)
*G09G 3/32* (2006.01)

(52) U.S. Cl.
CPC ...... *G09G 3/3225* (2013.01); *G09G 2310/0283* (2013.01); *G09G 2320/028* (2013.01)

(58) Field of Classification Search
CPC ............. G09G 3/36; G09G 3/30; G09G 5/00; G11G 19/00
USPC ............... 377/64–77, 78–81; 365/78; 257/43; 345/100, 64
See application file for complete search history.

(56) References Cited

U.S. PATENT DOCUMENTS

2004/0100427 A1* 5/2004 Miyazawa ...................... 345/76
2004/0104882 A1 6/2004 Kitani et al.
2006/0238482 A1* 10/2006 Jang et al. ..................... 345/100
2007/0105318 A1* 5/2007 Jeon et al. ...................... 438/264
2007/0297559 A1* 12/2007 Cho et al. ........................ 377/64
2008/0219401 A1* 9/2008 Tobita ............................. 377/79
2009/0225068 A1* 9/2009 Jeong et al. .................... 345/211
2010/0156858 A1* 6/2010 Moon et al. ................... 345/204

FOREIGN PATENT DOCUMENTS

CN 101127193 A 2/2008
CN 101261881 A 9/2008

(Continued)

OTHER PUBLICATIONS

SIPO Office action dated Aug. 5, 2015, for corresponding Chinese Patent application 201110065548.0, (6 pages).

*Primary Examiner* — Grant Sitta
*Assistant Examiner* — Amen Bogale
(74) *Attorney, Agent, or Firm* — Christie, Parker & Hale, LLP

(57) ABSTRACT

A scan driver and a display device including the same are provided. The scan driver according to an exemplary embodiment of the present invention generates and transmits at least two different types of scan signals to a display unit including a plurality of pixels, and includes a plurality of sequence drivers each including a plurality of shift registers for generating the different scan signals. In one of the sequence drivers, the scan signal generated in one of the shift registers is transmitted as the input signal of a next one of the shift registers, and the scan signal is concurrently transmitted as an input signal to another one of the shift registers of another one of the sequence drivers of a previous stage or a next stage adjacent to the one of the sequence drivers including the one of the shift registers according to the driving direction of the scan driver.

29 Claims, 8 Drawing Sheets

(56) References Cited

FOREIGN PATENT DOCUMENTS

| | | | |
|---|---|---|---|
| CN | 101527110 | A | 9/2009 |
| EP | 1 901 277 | A2 | 3/2008 |
| EP | 1 944 816 | A2 | 7/2008 |
| JP | 2002-196358 | | 7/2002 |
| JP | 2002-202762 | | 7/2002 |
| JP | 2006-220947 | | 8/2006 |
| JP | 2006-284798 | | 10/2006 |
| JP | 2008-046581 | | 2/2008 |
| JP | 2008-077051 | | 4/2008 |
| JP | 2010-097023 | | 4/2010 |
| KR | 10-2006-0078512 | A | 7/2006 |
| KR | 10-2007-0002836 | A | 1/2007 |
| WO | WO 2011/146756 | A1 | 11/2011 |

* cited by examiner

BI-DIRECTIONAL SCAN DRIVER AND DISPLAY DEVICE USING THE SAME

CROSS-REFERENCE TO RELATED APPLICATION

This application claims priority to and the benefit of Korean Patent Application No. 10-2010-0082514 filed in the Korean Intellectual Property Office on Aug. 25, 2010, the entire contents of which are incorporated herein by reference.

BACKGROUND

1. Field

The present invention relates to a bi-directional scan driver and a display device using the same.

2. Description of the Related Art

Recently, various flat panel displays that have reduced weight and volume in comparison to cathode ray tubes have been developed. As flat panel displays, there are liquid crystal displays (LCDs), field emission displays (FEDs), plasma display panels (PDPs), organic light emitting diode (OLED) displays, and the like.

Among the flat panel displays, the organic light emitting diode display, which displays images by using organic light emitting diodes (OLEDs) that generate light by recombining electrons and holes, has a fast response speed, is driven with low power consumption, and has excellent emission efficiency, luminance, and viewing angle, such that it has recently been in the spotlight.

Generally, the OLED display is classified as a passive matrix OLED (PMOLED) or an active matrix OLED (AMOLED) according to a driving method of the organic light emitting diodes (OLEDs).

The passive matrix OLED display uses a method in which an anode and a cathode are formed to cross each other and cathode lines and anode lines are selectively driven, and the active matrix OLED display uses a method in which a thin film transistor and a capacitor are integrated in each pixel and a voltage is maintained by a capacitor. The passive matrix OLED display has a simple structure and a low cost, however, it is difficult to realize a panel of a large size or high accuracy. In contrast, with the active matrix OLED display, it is possible to realize a panel of a large size or high accuracy, however it is technically difficult to realize the control method thereof and a comparatively high cost is required.

In view of resolution, contrast, and operation speed, the current trend is toward the organic light emitting diode (OLED) display of the active matrix type where respective unit pixels selectively turn on or off.

The organic light emitting diode (OLED) display of the active matrix type (e.g., AMOLED) includes a display device including pixels generally arranged in a matrix format, a data driver for transmitting data signals to data lines coupled to the pixels, and a scan driver for transmitting scan signals to scan lines coupled to the pixels.

In the driving method of the scan driver, the pixels are selected as a line unit (e.g., selected line by line) and the scan signal is sequentially supplied every horizontal period by using a plurality of shift registers included in the scan driver. The data driver supplies the data signals to the pixels selected as a line unit by the scan signal. Thus, the pixels display images corresponding to the data signals by supplying currents corresponding to the data signals to the respective organic light emitting diodes (OLEDs).

However, it is difficult for the above described one directional driving method in which the scan driver sequentially transmits the scan signal to the pixels to be applied to a portable communication device or a digital image device that has been developed recently according to various purposes and is equipped with various display panels that are changed according to an installation position when considering a viewing angle characteristic, such that driving of a bi-directional method has been proposed.

To drive the scan driver according to the bi-directional driving method regardless of the forward direction or the reverse direction, it is necessary to transmit the scan signal that is output from the scan driver to pixels of the display panel with a constant temporal sequence, and accordingly, a circuit design and development of such scan driver is required.

The above information disclosed in this Background section is only for enhancement of understanding of the background of the invention, and therefore it may contain information that does not form the prior art that is already known in this country to a person of ordinary skill in the art.

SUMMARY

Embodiments according to the present invention provide a scan driver capable of realizing various applications in a method of driving bi-directionally while transmitting a scan signal that is transmitted to pixels included in a display unit of an organic light emitting diode (OLED) display.

Also, embodiments according to the present invention provide a scan driver that can freely and conveniently realize an image in an upright or an upside down position by applying scan signals to the pixels of a same pixel line without a sequence change regardless of the selected driving direction of the bi-directional scan driver, and an organic light emitting diode (OLED) display including the same.

The technical problems to be solved by the present invention are not limited to the above-mentioned technical problems, and therefore other technical problems can be clearly understood by those skilled in the art to which the present invention pertains from the following description.

A scan driver generates and transmits at least two different types of scan signals to a display unit including a plurality of pixels, the scan driver including a plurality of sequence drivers including a plurality of shift registers for generating the at least two different types of scan signals.

One of the scan signals generated in one of the shift registers is transmitted as an input signal of a next one of the shift registers, and the one of the scan signals is concurrently transmitted as an input signal to the shift register of one of the sequence drivers of a previous stage or a next stage adjacent to one of the sequence drivers including the one of the shift registers in accordance with a driving direction of the scan driver. When the driving direction is a forward direction, the scan signal may be transmitted as the input signal to one of the shift registers of the one of the sequence drivers of the next stage adjacent to the sequence driver including the one of the shift registers, and when the driving direction is a backward direction, the scan signal may be transmitted as the input signal to one of the shift registers of the one of the sequence drivers of the previous stage adjacent to the sequence driver including the one of the shift registers.

The at least two different types of scan signals may include an initialization signal for initializing a gate voltage of a driving transistor included in the plurality of pixels, and a scan signal for controlling a switching operation of a switching transistor for transmitting the data signal corresponding to the plurality of pixels. The initialization signal may be generated and transmitted earlier than the scan signal.

The plurality of shift registers may include a first shift register for generating an initialization signal for initializing a gate voltage of a driving transistor included in the plurality of pixels, and a second shift register for generating the scan signal for controlling a switching operation of a switching transistor for transmitting a data signal corresponding to the plurality of pixels. The second shift register may be configured to receive the initialization signal as the input signal to generate the scan signal by shifting the initialization signal by a first period.

The initialization signal may be transmitted as the input signal to the first one of the shift registers of the sequence driver of the previous stage or the next stage adjacent to the sequence driver including the first one of the shift registers according to the driving direction of the scan driver in synchronization with the time that the initialization signal generated in the first one of the shift registers is transmitted as the input signal of the second one of the shift registers.

When the driving direction is a forward direction, the initialization signal may be transmitted as the input signal to the first one of the shift registers of the sequence driver of the next stage adjacent to the sequence driver including the first one of the shift registers.

When the driving direction is a backward direction, the initialization signal may be transmitted as the input signal to the first one of the shift registers of the sequence driver of the previous stage adjacent to the sequence driver including the first one of the shift registers.

Each of a plurality of sequence drivers of an odd stage among a plurality of sequence drivers may include: a first shift register for receiving a forward direction start signal and the scan signal generated in the shift register of the sequence driver of the previous stage adjacent to the corresponding sequence driver, or the scan signal generated in the shift register of the sequence driver of the next stage adjacent to the corresponding sequence driver, and a backward direction start signal as the first input signal in synchronization with a first clock signal, and for outputting one of a second clock signal and a first power source voltage as a first scan signal respectively corresponding to the first input signal and a first initialization signal; and a second shift register for receiving the first scan signal as the second input signal in synchronization with the second clock signal and for outputting one of the first clock signal and the first power source voltage as the second scan signal corresponding to the second input signal and a second initialization signal.

Each of a plurality of sequence drivers as an exemplary embodiment of the present invention may include at least two shift registers, and the plurality of shift registers may be sequentially coupled.

Each of the plurality of sequence drivers of an even stage among the plurality of sequence drivers may include: a first shift register for receiving the scan signal generated in the shift register of the sequence driver of the previous stage adjacent to the sequence driver of the corresponding state, or the scan signal generated in the shift register of the sequence driver of the next stage adjacent to the sequence driver of the corresponding state and a backward direction start signal as a third input signal in synchronization with a second clock signal, and for outputting one of a first clock signal and a first power source voltage as a first scan signal corresponding to the third input signal and the second initialization signal; and a second shift register for receiving the first scan signal as the fourth input signal in synchronization with the first clock signal, and for outputting one of the second clock signal and the first power source voltage as a second scan signal corresponding to a fourth input signal and the first initialization signal.

The second clock signal and the first clock signal may have a phase difference of a half cycle.

The first initialization signal may be generated in synchronization with the second clock signal or delayed by a period, and the second initialization signal may be generated in synchronization with the first clock signal or delayed by a period.

A phase difference between the first scan signal and the second scan signal may be same as a phase difference between the first clock signal and the second clock signal.

The cycle of the first clock signal, the second clock signal, the first initialization signal, and the second initialization signal may be at least one horizontal cycle.

The first shift register may include: a first transistor configured to turn on according to the forward direction driving control signal and for transmitting the forward direction start signal and the scan signal generated in the shift register of the sequence driver of the previous stage adjacent to the sequence driver of the corresponding stage as the first input signal; a second transistor configured to turn on according to the backward direction driving control signal and for transmitting the scan signal generated in the shift register of the sequence driver of the next stage adjacent to the sequence driver of the corresponding stage and the backward direction start signal as the first input signal; a third transistor configured to turn on according to the first clock signal and for transmitting the first input signal from the first transistor or the second transistor; a fourth transistor for receiving the first input signal from the first transistor or the second transistor, and configured to turn on according to the voltage level of the input signal, thereby transmitting the first power source voltage; a fifth transistor configured to turn on according to the second power source voltage transmitted the fifth transistor according to the first initialization signal, and for transmitting the first power source voltage; a sixth transistor configured to turn on according to the first initialization signal and for transmitting the second power source voltage to a first node coupled to a gate electrode of the fifth transistor; a seventh transistor configured to turn on according to the voltage level of the input signal transmitted through the third transistor, and for outputting the second clock signal as the first scan signal; and an eighth transistor configured to turn on according to the second power source voltage transmitted to the first node, and for outputting the first power source voltage as the first scan signal.

The first shift register may further include a first capacitor including an electrode coupled to the first node and another electrode coupled to the first power source voltage, and a second capacitor including an electrode coupled to a gate electrode of the seventh transistor and another electrode coupled to an output terminal of the first shift register.

The second shift register may include: a ninth transistor configured to turn on according to the second clock signal and for transmitting the first scan signal; a tenth transistor for receiving the first scan signal and configured to turn on according to the voltage level of the first scan signal, thereby transmitting the first power source voltage; a eleventh transistor configured to turn on according to the second power source voltage transmitted to the eleventh transistor according to the second initialization signal, the eleventh transistor for transmitting the first power source voltage; a twelfth transistor configured to turn on according to the second initialization signal and for transmitting the second power source voltage to a second node coupled to a gate electrode of the eleventh transistor; a thirteenth transistor configured to turn on according to the voltage level of the first scan signal transmitted through the ninth transistor and for outputting the first clock signal as the second scan signal; and a fourteenth transistor configured to turn on according to the second power source voltage transmitted to the second node and for outputting the first power source voltage as the second scan signal.

The second shift register may further include a third capacitor having an electrode coupled to the second node and another electrode coupled to the first power source voltage, and a fourth capacitor having an electrode coupled to a gate electrode of the thirteenth transistor and another electrode coupled to an output terminal of the second shift register.

The transistors may be realized as PMOS transistors or NMOS transistors.

The first shift register forming a plurality of sequence drivers of the even stage may include: a first switch configured to turn on according to a forward direction driving control signal and for transmitting the scan signal generated in the shift register of the sequence driver of the previous stage adjacent to the sequence driver of the corresponding stage as the third input signal; a second switch configured to turn on according to the backward direction driving control signal and for transmitting the scan signal generated in the shift register of the sequence driver of the next stage adjacent to the corresponding sequence driver and the backward direction start signal as the third input signal; a third switch configured to turn on according to the second clock signal and for transmitting the third input signal from the first switch or the second switch; a fourth switch for receiving the third input signal and configured to turn on according to the voltage level of the third input signal, thereby transmitting the first power source voltage; a fifth switch configured to turn on according to the second power source voltage transmitted to the fifth switch according to the second initialization signal, the fifth switch for transmitting the first power source voltage; a sixth switch configured to turn on according to the second initialization signal and for transmitting the second power source voltage to a third node coupled to a gate electrode of the fifth switch; a seventh switch configured to turn on according to the voltage level of the third input signal transmitted through the third switch and for outputting the first clock signal as the first scan signal; and an eighth switch configured to turn on according to the second power source voltage transmitted to the third node, and for outputting the first power source voltage as the first scan signal. The first shift register may further include a fifth capacitor including an electrode coupled to the third node and another electrode coupled to the first power source voltage, and a sixth capacitor including an electrode coupled to a gate electrode of the seventh switch and another electrode coupled to an output terminal of the first shift register.

The second shift register forming a plurality of sequence drivers of the odd stage may include: a ninth switch configured to turn on according to the first clock signal and for transmitting the first scan signal; a tenth switch for receiving the first scan signal and configured to turn on according to the voltage level of the first scan signal, thereby transmitting the first power source voltage; an eleventh switch configured to turn on according to the second power source voltage transmitted to the eleventh switch according to the first initialization signal, the eleventh switch for transmitting the first power source voltage; a twelfth switch configured to turn on according to the first initialization signal and for transmitting the second power source voltage to a fourth node coupled to a gate electrode of the eleventh switch; a thirteenth switch configured to turn on according to the voltage level of the first scan signal transmitted through the ninth switch, and for outputting the second clock signal as the second scan signal; and a fourteenth switch configured to turn on according to the second power source voltage transmitted to the fourth node and for outputting the first power source voltage as the second scan signal.

The second shift register may further include a seventh capacitor having an electrode coupled to the fourth node and another electrode coupled to the first power source voltage, and an eighth capacitor having an electrode coupled to a gate electrode of the thirteenth switch and another electrode coupled to an output terminal of the second shift register.

The switches may be realized by PMOS transistors or NMOS transistors.

A display device according to an embodiment of the present invention includes: a display unit including a plurality of pixels; a scan driver for transmitting at least two different types of scan signals to the plurality of pixels; a data driver for transmitting a data signal to the plurality of pixels; a light emission control driver for transmitting a light emission control signal to the plurality of pixels; and a signal controller for generating and transmitting a plurality of control signals for controlling the scan driver, the data driver, and the light emission control driver, wherein the scan driver includes a plurality of sequence drivers including a plurality of shift registers for generating the at least two different types of scan signals, and wherein one of the scan signals generated in one of the shift registers is transmitted as an input signal of a next one of the shift registers, and the one of the scan signals is concurrently transmitted to the shift register of one of the sequence drivers of a previous stage or a next stage adjacent to the one of the sequence drivers including the one of the shift registers as the input signal according to a driving direction of the scan driver. The signal controller may be configured to generate and transmit a forward direction driving control signal and a backward direction driving control signal for determining the driving direction of the scan driver.

The forward direction driving control signal and the backward direction driving control signal may be inverted signals. Accordingly, when the scan driver of the display device is determined into one driving direction by the forward direction driving control signal and the backward direction driving control signal, the sequence of the at least two different types of scan signals transmitted to the plurality of pixels is constant regardless of the driving direction.

According to the embodiments of the present invention, the scan driver capable of driving the variously scan signals to the pixels included in the display unit of the display device with the bi-directional driving and the organic light emitting diode (OLED) display including the same may be provided.

Also, although any direction may be selected in the scan driver applied with the bi-directional scan driving, the sequence of the scan signals transmitted to the transistors included in the pixels is not changed, and the images can be freely displayed in an upright position or an upside down position, thereby convenience of usage and application of the organic light emitting diode (OLED) display may be provided.

DETAILED DESCRIPTION

Figure 1:
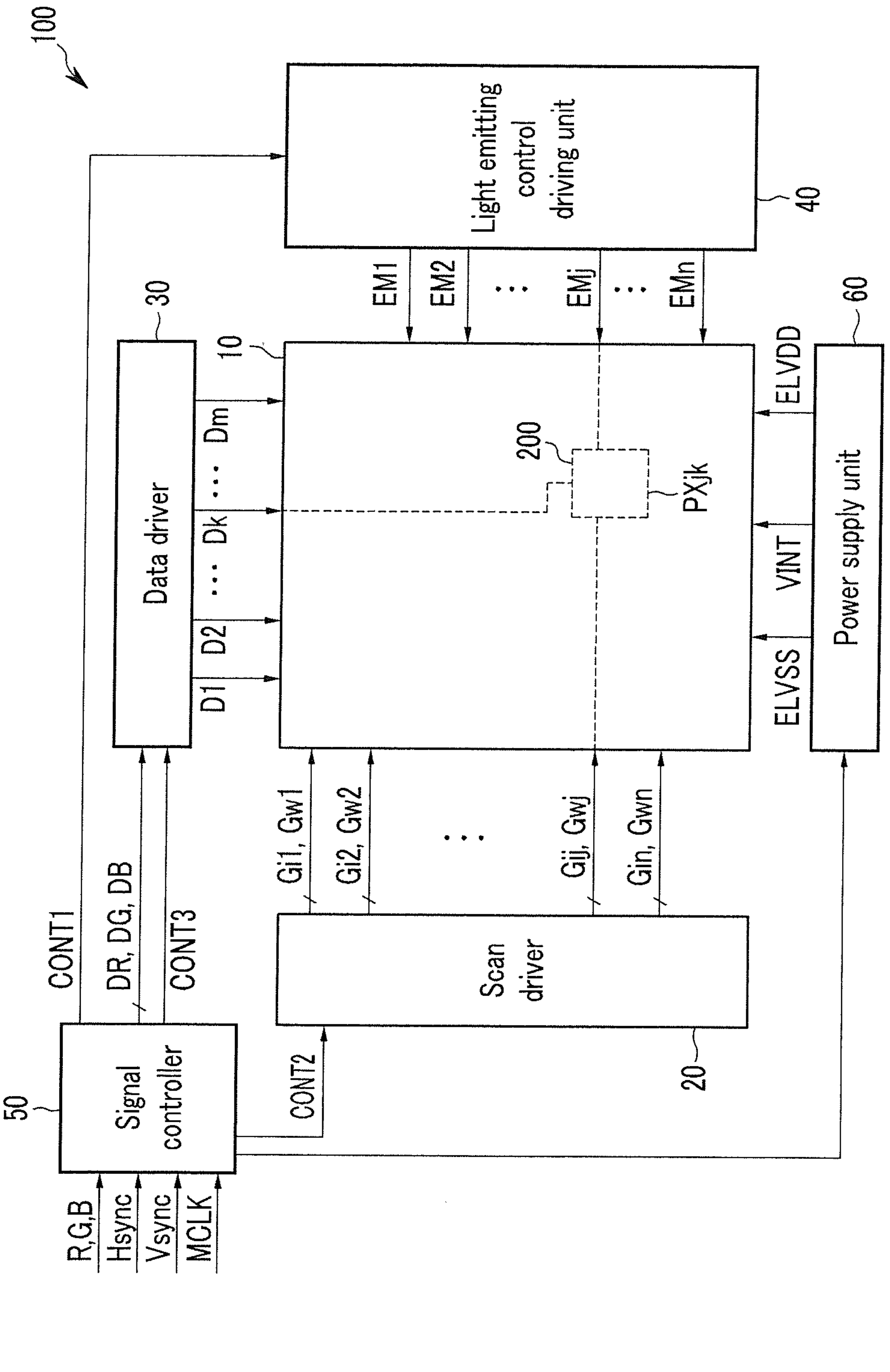
FIG. 1 is a block diagram of a display device according to an exemplary embodiment of the present invention.

Hereinafter, the present invention will be described more fully with reference to the accompanying drawings, in which exemplary embodiments of the invention are shown. As those skilled in the art would realize, the described exemplary embodiments may be modified in various different ways, all without departing from the spirit or scope of the present invention.

Further, like reference numerals denote like components throughout several exemplary embodiments. A first exemplary embodiment will be representatively described, and components other than those of the first exemplary embodiment will be described in other exemplary embodiments.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through one or more third elements. In addition, unless explicitly described to the contrary, the word "comprise" and variations such as "comprises" or "comprising" will be understood to imply the inclusion of stated elements but not the exclusion of any other elements.

FIG. 1 is a block diagram of a display device according to an exemplary embodiment of the present invention.

A display device 100 according to an exemplary embodiment of the present invention includes a display unit 10 including a plurality of pixels, a scan driver 20 for transmitting a plurality of scan signals to the display unit 10, a data driver 30 for transmitting a plurality of data signals to the display unit 10, a light emitting control driving unit (e.g., a light emission control driver) 40 for transmitting a plurality of light emission control signals to the display unit 10, a power supply unit 60 for supplying driving power source voltages to the display unit 10, and a signal controller 50 for supplying a plurality of control signals that are transmitted to the scan driver 20, the data driver 30, and the light emission control driver 40.

The display unit 10 includes a plurality of pixels 200 that are arranged in a matrix format, and the pixels 200 respectively include an organic light emitting diode (OLED) for emitting light corresponding to a driving current according to the data signal transmitted from the data driver 30.

The pixels 200 are coupled to a plurality of scan lines Gi1 to Gin and Gw1 to Gwn formed in a row direction for transmitting the scan signal, and a plurality of data lines D1 to Dm formed in a column direction for transmitting the data signal. Also, the pixels 200 are coupled to a plurality of light emission control lines EM1 to EMn formed in the row direction for transmitting the light emission control signal.

That is, one pixel PXjk of the plurality of pixels 200 is coupled to at least two scan lines Gij and Gwj, one data line Dk, and one light emission control line EMj. However, this is only exemplary and the present invention is not limited thereto, and at least two scan lines may be coupled to the corresponding pixel.

In the pixel PXjk, the current is supplied to the organic light emitting diode OLED according to the corresponding data signal, and the organic light emitting diode OLED emits light of a predetermined luminance according to the supplied current.

A first power source voltage ELVDD, a second power source voltage ELVSS, and an initial power source voltage VINT for the operation of the display unit 10 are transmitted from the power supply unit 60.

The scan driver 20, which is for applying a plurality of scan signals to the display unit 10, is coupled to at least two types of scan lines, for example, the plurality of scan lines Gi1 to Gin and Gw1 to Gwn, such that the plurality of scan signals are transmitted to the corresponding scan lines of the plurality of scan lines.

The scan driver 20 sequentially generates and transmits the scan signal to at least two scan lines coupled to the plurality of pixel rows included in the display unit 10 according to the scan driving control signal CONT2 supplied from the signal controller 50. The circuit configuration of the scan driver 20 will be described later in more detail.

The scan driver 20 according to an exemplary embodiment of the present invention may transmit the scan signals to two scan lines without exchange of the scan signals applied to two scan lines in the case of the bi-directional driving.

The data driver 30 generates a plurality of data signals from image data signals DR, DG, and DB transmitted from the signal controller 50, and transmits them to the plurality of data lines D1 to Dm coupled to the display unit 10. The driving of the data driver 30 is operated in accordance with the data driving control signal CONT3 supplied from the signal controller 50.

The light emission control driver 40 generates and transmits a plurality of light emission control signals to the plurality of light emission control lines EM1 to EMn coupled to the display unit 10 according to the light emission control driver control signal CONT1 supplied from the signal controller 50.

The plurality of pixels included in the display unit 10 receive the corresponding light emission control signals, and each pixel emits the organic light emitting diode OLED in accordance with the data voltage corresponding to the data signal, thereby displaying images.

Figure 2:
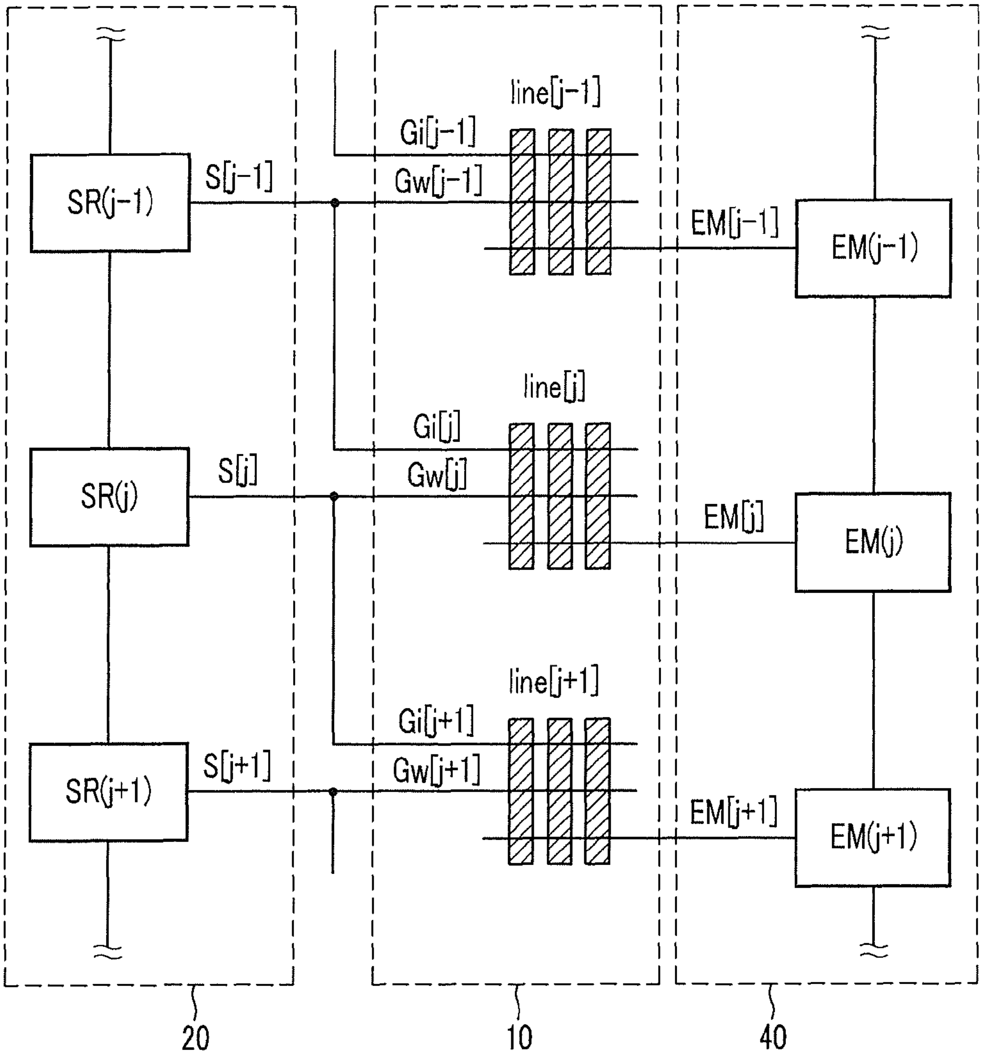
FIG. 2 is a block diagram of a display device including a scan driver and a pixel of a conventional driving method.

The scan driver 20 included in the display device 100 scans and drives the pixels of the display unit 10 in one direction while generally having the configuration as shown in the block diagram of FIG. 2.

FIG. 2 is a block diagram showing a portion of the configuration of the display device 100. Here, FIG. 2 shows a portion of shift registers of the scan driver 20 coupled to the scan lines and the light emission control driver 40 coupled to the light emission control lines of the display unit 10.

Referring to FIG. 2, in the related art, the scan driver 20 includes the plurality of corresponding shift registers coupled to the scan lines that are coupled to the pixels of the display unit 10. In detail, a pixel of the display unit 10 is coupled to at least two scan lines for receiving the at least two types of scan signals. The output signal output from the output terminal of the shift register of the scan driver 20 corresponding to the predetermined pixel line is concurrently (e.g., simultaneously) supplied to the scan line coupled to the predetermined pixel line and the scan line coupled to the next pixel line. Also, the output signal is used as the input signal of the shift register of the next stage.

That is, the output signal S[j−1] output from the shift register SR(j−1) of the scan driver 20 coupled to the scan line coupled to the [j−1]-th pixel line of the display unit 10 is transmitted as scan signal Gw[j−1] to the plurality of pixels included in the [j−1]-th pixel line, and is concurrently (e.g., simultaneously) transmitted as an initialization signal Gi[j] to the pixels included in the next j-th pixel line.

Also, the output signal S[j−1] of the [j−1]-th shift register SR(j−1) is transmitted as the input signal of the j-th shift register SR(j) of the next stage.

Thus, the j-th shift register SR(j) is operated to generate the output signal S[j]. The output signal S[j] is transmitted to the plurality of pixels included in the j-th pixel line as the scan signal Gw[j], and is concurrently (e.g., simultaneously) transmitted as the initialization signal Gi[j+1] to the plurality of pixels includes the [j+1]-th pixel line of the next state.

Figure 3:
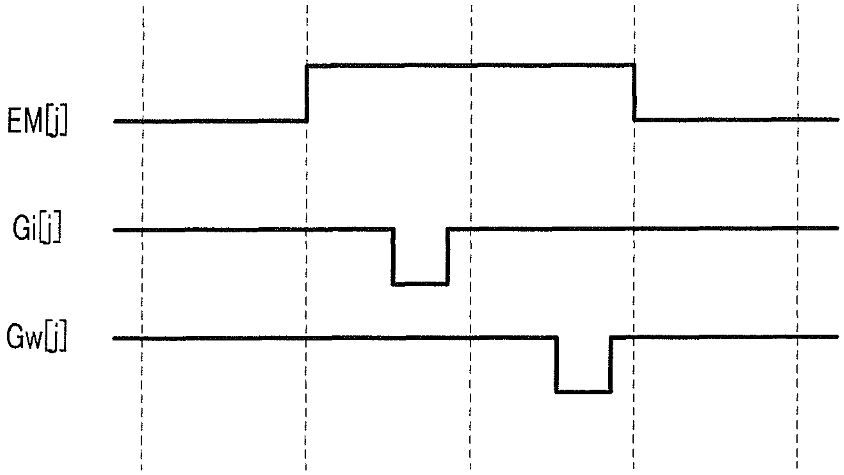
FIG. 3 is a signal waveform diagram showing a driving signal of a conventional display device.

Through this method, the plurality of pixels included in each pixel line sequentially receive the initialization signal and the scan signal and are driven according to the signal waveforms shown in the FIG. 3. That is, after the initialization signal Gi[j] and the scan signal Gw[j] are sequentially transmitted to the plurality of pixels coupled to the j-th pixel line, as shown in the waveform diagram of FIG. 3, the plurality of pixels of the j-th pixel line emit light according to the light emission control signal EM[j] that are transmitted to the pixels, thereby displaying the images.

In the driving method according to the related art, the plurality of shift registers corresponding to the scan lines and the pixel lines sequentially transmit the output signals in the up and down directions.

Accordingly, the initialization signal Gi is transmitted earlier in time than the scan signal Gw in the output signals of the scan driver 20 that are transmitted respectively through two scan lines coupled to the plurality of pixel lines of the display unit 10.

However, when the scan driver 20 driven by the above described driving method is operated in a backward direction driving method, the scan signal Gw transmitted to one of the two scan lines coupled to the pixel line is generated and transmitted earlier than the initialization signal Gi transmitted to the other one of the two scan lines such that the driving of the pixel is impossible.

Figure 4:
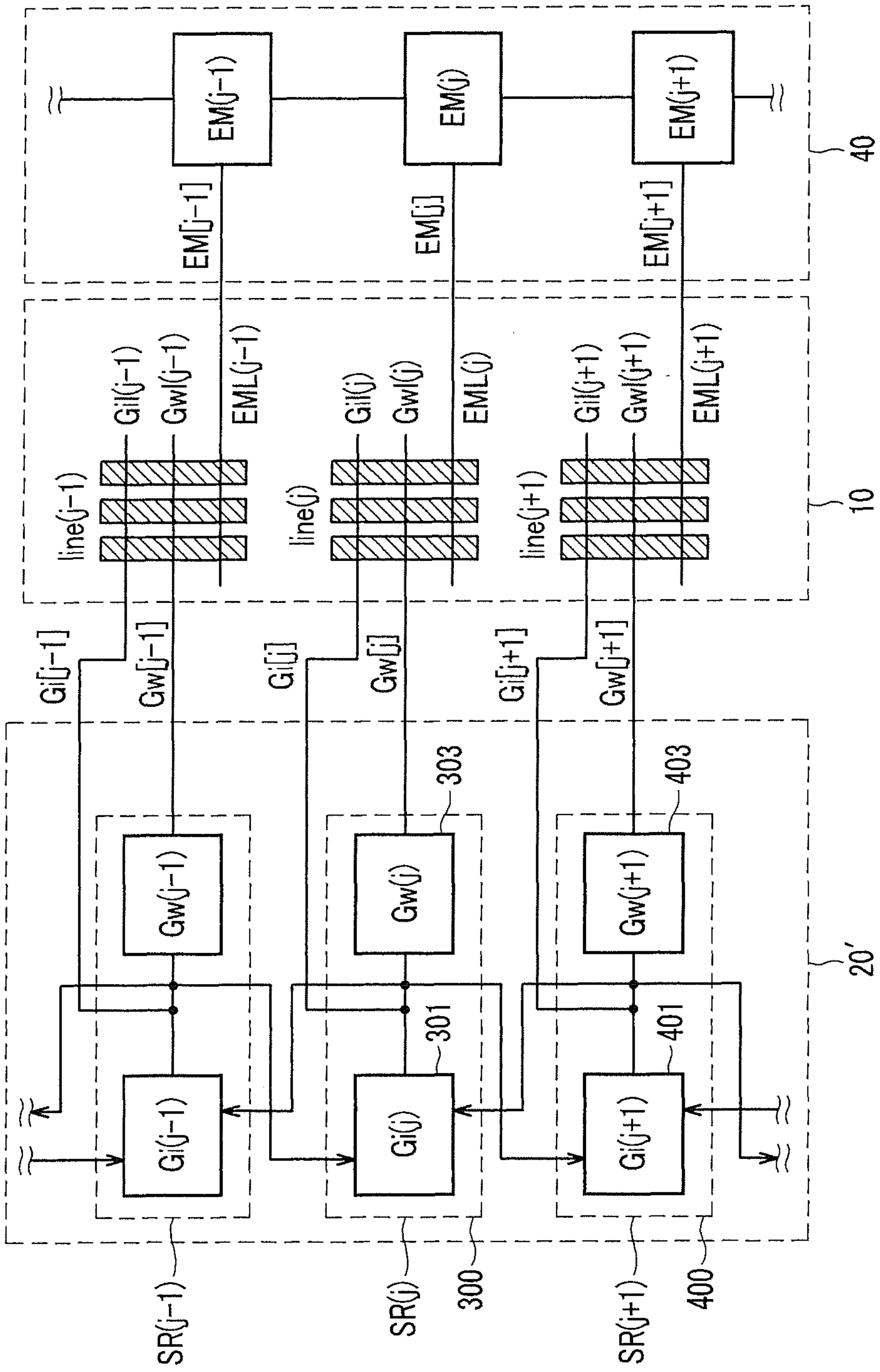
FIG. 4 is a block diagram of a display device including a scan driver and a pixel of a driving method according to an exemplary embodiment of the present invention.

FIG. 4 is a schematic diagram of a display device including a portion of a scan driver 20' according to an embodiment of the present invention, in which the sequence of the initialization signal and the scan signal that are supplied to the plurality of pixels is not changed under the bi-directional driving method to solve the problem described in reference to FIG. 2.

Referring to FIG. 4, the pixel line of the display unit 10 including a plurality of pixels is coupled to at least two scan lines Gil and Gwl and one light emission control line EML. Although not shown in FIG. 4, the pixel included in each pixel line is coupled to the data line such that the data signal is transmitted to the data line when the corresponding pixel is selected by the scan signal.

In FIG. 4, the number of scan lines Gil and Gwl coupled to each pixel line is two, however the present invention is not limited thereto. For example, a scan line for transmitting the signals to the gate electrode of the transistor according to the circuit structure of the pixel and for controlling the switching operation of the pixel may be additionally formed.

The scan driver 20' of the present invention according to the exemplary embodiment of FIG. 4 includes a plurality of shift registers ( . . . SR(j−1), SR(j), SR(j+1), . . . ) respectively corresponding to pixel lines of the display unit 10, and each stage of the shift registers is sequentially coupled to the next stage. The shift register includes two sub-shift registers, and the two sub-shift registers are the first shift register ( . . . Gi[j−1], Gi[j], Gi[j+1], . . . ) coupled to the first scan line Gil among the scan lines Gi[l] and Gw[l] coupled to the plurality of pixel lines and for supplying the first scan signal, and the second shift register ( . . . Gw[j−1], Gw[j), Gw[j+1], . . . ) coupled to the second scan line Gwl among the scan lines Gil and Gwl coupled to the plurality of pixel lines and for supplying the second scan signal.

The first shift register and the second shift register are coupled to each other, and the first scan signal generated in the first shift register is transmitted as the input signal to drive the second shift register. Thus, the second shift register generates the second scan signal and transmits the second scan signal to the second scan line coupled to the plurality of pixel lines. Accordingly, a difference is generated between the times that the first scan signal and the second scan signal are generated and transmitted, and the first scan signal is firstly transmitted to the plurality of pixel lines. The first scan signal is transmitted as the initialization signal to the plurality of pixels included in the plurality of pixel lines such that each pixel is reset by the initialization voltage.

Also, the first scan signal is supplied to a first scan line coupled to the plurality of pixel lines, and is concurrently (e.g., simultaneously) supplied to the first shift register of the previous stage or the next stage of the corresponding stage of the shift register according to the driving direction selected by a direction driving control signal of the scan driver 20'.

Thus, the first shift register of the stage receiving the first scan signal from the previous or next stage is operated to generate the corresponding first scan signal.

In more detail, this is described with reference to the scan driver 20' coupled to the plurality of pixels included in the j-th pixel line among the plurality of pixel lines in FIG. 4.

The plurality of shift registers of the scan driver 20' corresponding to the j-th pixel line are shift registers 300 of the j-th stage, and the shift registers 300 of the j-th stage include a first shift register 301 and a second shift register 303.

The first shift register 301 is coupled to the first scan line Gil(j) that is coupled to the j-th pixel line to generate and transmit the first scan signal Gi[j].

The first scan signal Gi[j] is concurrently (e.g., simultaneously) transmitted to the input terminal of the second shift register 303 to drive the second shift register 303, and the second shift register 303 is coupled to the second scan line Gwl(j) that is coupled to the j-th pixel line to generate and transmit the second scan signal Gw[j].

Also, the first scan signal Gi[j] is supplied to the shift register 400 of the j+1 stage as the next stage or the shift register SR(j−1) of the j−1 stage as the previous stage of the shift register 300 of the j stage according to the driving direction selected by the direction driving control signal of the scan driver 20'.

In more detail, if the driving direction selected according to the direction driving control signal of the scan driver 20' is the forward direction in the up to down direction of the display unit 10, the first scan signal Gi[j] is supplied to the input terminal of a first shift register 401 of a j+1 stage shift register 400 as the next stage to drive the first shift register 401. On the other hand, if the driving direction is the backward direction in the down to up direction of the display unit 10, the first scan signal Gi[j] is supplied to the input terminal of the first shift register Gi[j−1] of the j−1 stage shift register SR(j−1) as the previous stage to drive the first shift register Gi[j−1].

Accordingly, the shift register of the scan driver 20' according to an exemplary embodiment of the present invention has the same temporal sequence for the first scan signal and the second scan signal that are generated and transmitted in the shift register corresponding to the pixel line regardless of whether the driving direction is the forward direction or the backward direction.

That is, for the first scan signal and the second scan signal that are generated in the plurality of shift registers and are transmitted to the pixel line of the display unit 10, the first scan signal is firstly generated and transmitted, and then the second scan signal is generated and transmitted regardless of whether the plurality of shift registers are driven in the forward direction or the backward direction, so the plurality of pixels of the display unit 10 may be stably driven.

Figure 5:
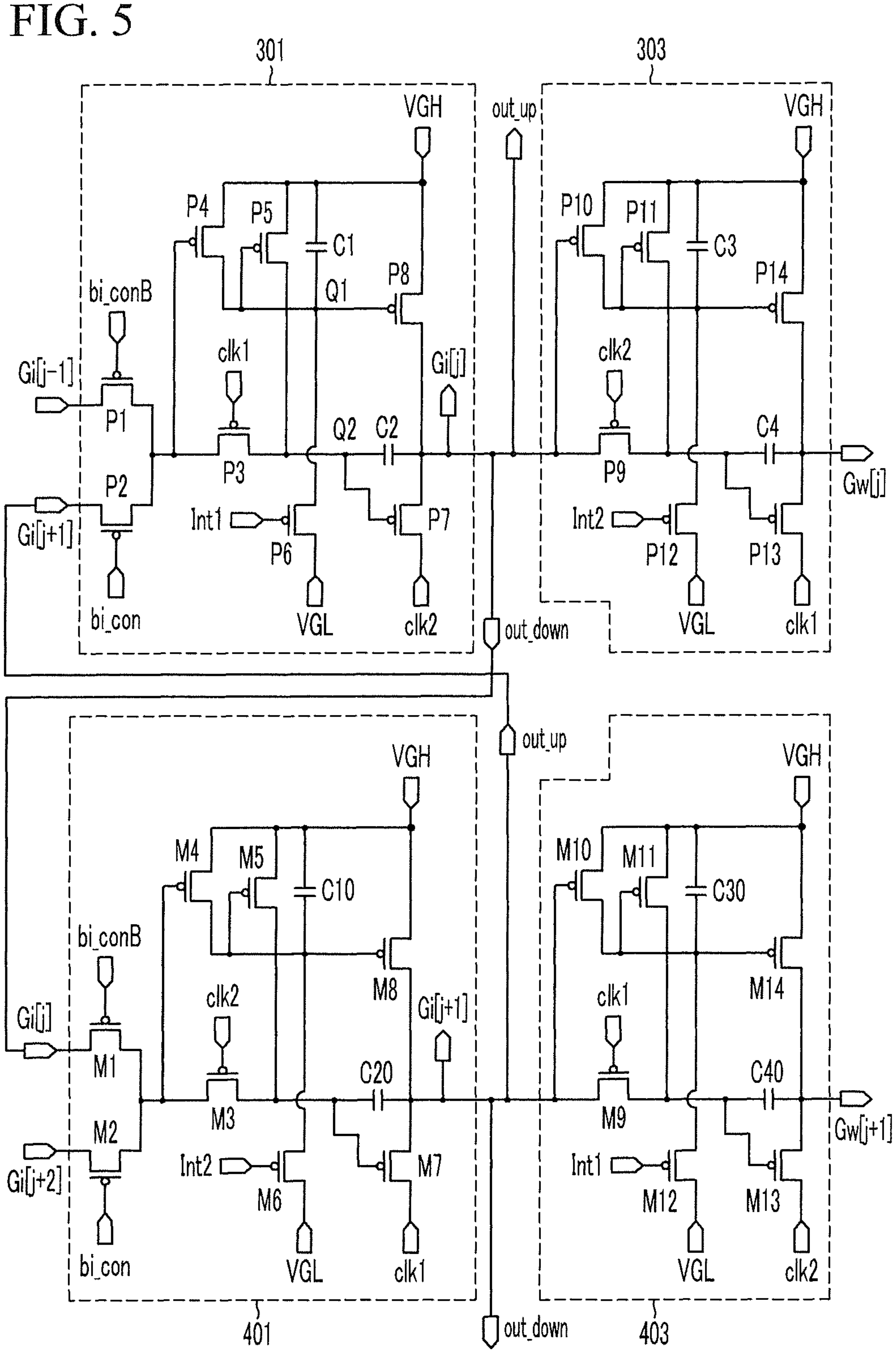
FIG. 5 is a circuit diagram of a scan driver according to an exemplary embodiment of the present invention.

A detailed circuit configuration according to the exemplary embodiment of the scan driver 20' shown in FIG. 4 is shown in FIG. 5.

The scan driver 20' shown in FIG. 4 includes a plurality of shift registers that are sequentially coupled to each other.

The circuit diagram of the scan driver 20' shown in FIG. 5 illustrates the j stage shift register 300 and the j+1 stage shift register 400 as the next stage thereof among the plurality of shift registers.

The j stage shift register 300 includes the first shift register 301 of the j stage and the second shift register 303 of the j stage, and the j+1 stage shift register 400 includes the first shift register 401 of the j+1 stage and the second shift register 403 of the j+1 stage.

The j stage first shift register 301 has two input terminals. One of the two input terminals is input with the first scan signal Gi[j−1] transmitted from the first shift register of the j−1 stage as the previous stage, and the other one of the two input terminals is input with the first scan signal Gi[j+1] transmitted from the first shift register 401 of the j+1 stage as the next stage.

Also, the first shift register 301 of the j stage has one output terminal, and the first scan signal Gi[j] is generated and output to the first scan line coupled to the j-th pixel line of the display unit 10 corresponding to the j stage through the output terminal.

Simultaneously, the first scan signal Gi[j] is transmitted to the input terminal of the second shift register 303. Also, the first scan signal Gi[j] is transmitted to the input terminal of the first shift register of the previous stage of the j stage or the next stage.

On the other hand, the second shift register 303 of the j stage has one output terminal and is driven according to the first scan signal Gi[j] transmitted through the input terminal such that the second scan signal Gw[j] is generated and output to the second scan line coupled to the j-th pixel line of the display unit 10 corresponding to the j stage through the output terminal.

Accordingly, the first scan signal Gi[j] and the second scan signal Gw[j] that are generated through one j stage shift register 300 have a temporal gap, and the first scan signal Gi[j] is firstly transmitted to the plurality of pixels included in the corresponding pixel line.

As will be described through the circuit diagram of the pixel, the first scan signal Gi[j] is operated as the initialization signal to apply an initialization voltage for resetting the pixel being driven. Also, the second scan signal Gw[j] that is secondly transmitted functions as the scan signal for controlling the switching operation of the pixel such that the data signal is applied to the selected pixel.

The first scan signal Gi[j] generated through the first shift register 301 of the j stage is transmitted to the input terminal of the first shift register of the previous stage or the next stage. In the case of the forward direction driving, the first scan signal Gi[j] is transmitted to the input terminal of the first shift register 401 of the j+1 stage as the next stage, and in the case of the backward direction driving, the first scan signal Gi[j] is transmitted to the input terminal of the first shift register of the j−1 stage as the previous stage.

Thus, in the case of the forward direction driving, the first shift register 401 of the j+1 stage, in response to receiving the first scan signal Gi[j], generates and outputs the first scan signal Gi[j+1] that is transmitted to the plurality of pixels of the (j+1)-th pixel line through the output terminal.

Next, the configuration of the j stage shift register 300 and the j+1 stage shift register 400 shown in FIG. 5 will be described in more detail.

In FIG. 5, a plurality of transistors P1-P14 and M1-M14 may be PMOS transistors. However, they are not limited thereto.

The PMOS transistor is used as the switch in the circuit shown in FIG. 5.

The PMOS transistor includes gate, source, and drain electrodes, and an electrical connection degree of the PMOS transistor is determined according to a voltage difference between the voltage input to the gate electrode and the voltage of the source electrode.

Referring to FIG. 5, the first shift register 301 of the j stage shift register 300 includes the plurality of transistors P1 to P8 and a plurality of capacitors C1 and C2.

The first shift register 301 of the j stage may receive the first scan signal generated in the previous stage or the next stage through two input terminals.

The first scan signal Gi[j−1] transmitted from the first shift register of the j−1 stage as the previous stage is transmitted from the source electrode through the drain electrode when the first transistor P1 of the first shift register 301 is turned on. Here, the signal controlling the switching operation of the first transistor P1 is the forward direction driving control signal bi_conB of the scan driver.

On the other hand, the first scan signal Gi[j+1] transmitted from the first shift register 401 of the j+1 stage as the next stage is transmitted from the source electrode through the drain electrode when the second transistor P2 of the first shift register 301 is turned on. Here, the signal controlling the switching operation of the second transistor P2 is the backward direction driving control signal bi_con of the scan driver.

One of two first scan signals, which are respectively supplied through two input terminals of the first shift register 301 of the j stage, is transmitted according to the determination of the driving direction of the scan driver. The forward direction driving control signal bi_conB and the backward direction driving control signal bi_con, which determine the driving direction of the scan driver, are signals with reversed voltage levels such that the direction of the scan driver may be determined. That is, the first transistor P1 is turned on according to the forward direction driving control signal bi_conB during a period for the driving of the forward direction, and the second transistor P2 is turned on according to the backward direction driving control signal bi_con during the period for the backward direction.

If the shift register of the scan driver is in the first stage and the scan driver is driven in the forward direction, the input signal transmitted through the first transistor P1 is a predetermined forward direction start signal or the forward direction start signal. In contrast, if the shift register of the scan driver is in the final stage and the scan driver is driven in the backward direction, the input signal transmitted through the second transistor P2 is a predetermined backward direction start signal or a backward direction start signal.

On the other hand, the first shift register of each stage of the scan driver according to an exemplary embodiment of the present invention receives a first clock signal clk1 having at least two pulses, a second clock signal clk2 having a phase different from the first clock signal clk1 by half a cycle, and the first initialization signal Int1 generated in synchronization with the second clock signal clk2 or delayed by a predetermined time or the second initialization signal Int2 generated in synchronization with the first clock signal clk1 or delayed by the predetermined time, as well as the input signal (the first scan signal of the previous stage or the next stage) transmitted through the input terminal. Accordingly, the first shift register shifts the input signal (the first scan signal of the previous stage or the next stage) by the predetermined period to generate the first scan signal of the corresponding stage.

The second shift register of each stage of the scan driver according to an exemplary embodiment of the present invention receives the first clock signal clk1 having at least two pulses, the second clock signal clk2 having a phase different from the first clock signal clk1 by half a cycle, and the first initialization signal Int1 generated in synchronization with the second clock signal clk2 or delayed by a predetermined time or the second initialization signal Int2 generated in synchronization with the first clock signal clk1 or delayed by the predetermined time, as well as the input signal (the first scan signal of the corresponding stage) transmitted through the input terminal. Accordingly, the second shift register shifts its input signal (the first scan signal of the corresponding stage) by the predetermined period to generate the second scan signal of the corresponding stage.

The circuit configuration of the first shift register and the second shift register of the shift register of each stage included in the scan driver according to an exemplary embodiment of the present invention is the same. However, the application of the first clock signal clk1 and the second clock signal clk2 and the application of the first initialization signal Int1 and the second initialization signal Int2 to two adjacent stages are exchanged.

Also, the common circuit configuration of a plurality of the first shift registers or a plurality of the second shift registers corresponding to each stage of the scan driver is the same. However, the application of the first clock signal clk1 and the second clock signal clk2, and the application of the first initialization signal Int1 and the second initialization signal Int2 are exchanged with each other.

The first transistor P1 of the first shift register 301 of the j stage includes a source electrode for receiving the first scan signal Gi[j−1] transmitted from the first shift register of the j−1 stage as the previous stage, a gate electrode for receiving the forward direction driving control signal bi_conB, and a drain electrode coupled to a source electrode of the third transistor P3.

The second transistor P2 includes a source electrode for receiving the first scan signal Gi[j+1] transmitted from the first shift register 401 of the j+1 stage as the next stage, a gate electrode supplied with the backward direction driving control signal bi_con, and a drain electrode coupled to the source electrode of the third transistor P3.

The third transistor P3 includes the source electrode coupled to the drain electrode of the first transistor P1 and the drain electrode of the second transistor P2, a gate electrode for receiving the first clock signal clk1, and a drain electrode coupled to one electrode of the second capacitor C2.

The third transistor P3 transmits the first scan signal Gi[j−1] in the case of the forward direction driving or the first scan signal Gi[j+1] in the case of the backward direction driving to a gate electrode of the seventh transistor P7 according to the first clock signal clk1.

The fourth transistor P4 transmits a first power source voltage VGH from a source coupled to a source electrode and a gate electrode of the eighth transistor P8 according to the first scan signal Gi[j−1] in the case of the forward direction driving or the first scan signal Gi[j+1] in the case of the backward direction driving.

The fifth transistor P5 includes a source electrode coupled to a source that supplies the first power source voltage VGH, a gate electrode coupled to a node Q1 that is coupled to one electrode of the first capacitor C1 and a gate electrode of the eighth transistor P8, and a drain electrode coupled to one electrode of the second capacitor C2.

The fifth transistor P5 according to an exemplary embodiment may include at least two transistors coupled in series, and the at least two transistors may be turned on according to a second power source voltage VGL.

The switching operation of the fifth transistor P5 is controlled according to the second power source voltage VGL transmitted by the sixth transistor P6 that is turned on in response to the first initialization signal Int1. When the fifth transistor P5 is turned on, the first power source voltage VGH is transmitted to the seventh transistor P7.

The sixth transistor P6 includes a source electrode coupled to the second power source voltage VGL, a gate electrode coupled to the first initialization signal Int1, and a drain electrode coupled to the node Q1 that is coupled to one electrode of the first capacitor C1, the gate electrode of the eighth transistor P8, and the gate electrode of the fifth transistor P5.

The sixth transistor P6 transmits the second power source voltage VGL according to the first initialization signal Int1 to the fifth transistor P5 and the eighth transistor P8.

The seventh transistor P7 includes a source electrode coupled to the second clock signal clk2, a gate electrode coupled to one electrode of the second capacitor C2, and a drain electrode coupled to the output terminal of the first shift register 301.

The seventh transistor P7 outputs the first scan signal Gi[j] transmitted to the j-th pixel line with the voltage level of the second clock signal clk2 through the output terminal in response to the first scan signal Gi[j−1] in the case of the forward direction driving or the first scan signal Gi[j+1] in the case of the backward direction driving.

The first scan signal Gi[j] transmitted to the j-th pixel line is supplied to the input terminal of the first shift register of the previous stage and the next stage.

Also, it is concurrently (e.g., simultaneously) supplied to the input terminal of the second shift register 303 of the j stage.

The eighth transistor P8 includes the source electrode coupled to the source that supplies the first power source voltage VGH, the gate electrode coupled to the node Q1, and the drain electrode coupled to the output terminal of the first shift register 301.

When the eighth transistor P8 receives the second power source voltage VGL through the sixth transistor P6 that is turned on in response to the first initialization signal Int1 and is turned on, the first power source voltage VGH is output as the first scan signal Gi[j] transmitted to the j-th pixel line through the output terminal.

The first capacitor C1 includes one electrode coupled to the node Q1 that is coupled to the gate electrode of the eighth transistor P8, the gate electrode of the fifth transistor P5, the drain electrode of the sixth transistor P6, and the drain electrode of the fourth transistor P4, and the other electrode of the first capacitor C1 is coupled to the source that supplies the first power source voltage VGH.

The second capacitor C2 includes one electrode coupled to the gate electrode of the seventh transistor P7, and the other electrode of the second capacitor C2 is coupled to the drain electrode of the eighth transistor P8, the drain electrode of the seventh transistor P7, and the output terminal of the first shift register 301.

The switching operation of the seventh transistor P7 is controlled by the voltage applied at the node Q2 that is coupled to one electrode of the second capacitor C2 and the gate electrode of the seventh transistor P7.

The second shift register 303 of the j stage includes the ninth transistor P9 to the fourteenth transistor P14 respectively corresponding to the third transistor P3 to the eighth transistor P8 of the first shift register 301, and has substantially the same configuration as the first shift register 301.

Also, the second shift register 303 includes a third capacitor C3 and a fourth capacitor C4 respectively corresponding to the first capacitor C1 and the second capacitor C2 of the first shift register 301.

However, the second clock signal clk2, the first clock signal clk1, and the second initialization signal Int2 are transmitted to components of the second shift register 303 corresponding to components of the first shift register 301 that receive the first clock signal clk1, the second clock signal clk2, and the first initialization signal Int1.

In the scan driver of FIG. 5, the configuration of the first shift register 301 and the second shift register 303 of the j stage is equally applied to the first shift register 401 and the second shift register 403 of the j+1 stage as the next stage.

However, the application of the first clock signal clk1 and the second clock signal clk2, and the application of the first initialization signal Int1 and the second initialization signal Int2 are exchanged.

The detailed configuration is previously described in reference to the first shift register 301 and the second shift register 303 of the j stage such that the overlapping description is omitted.

Figure 6:
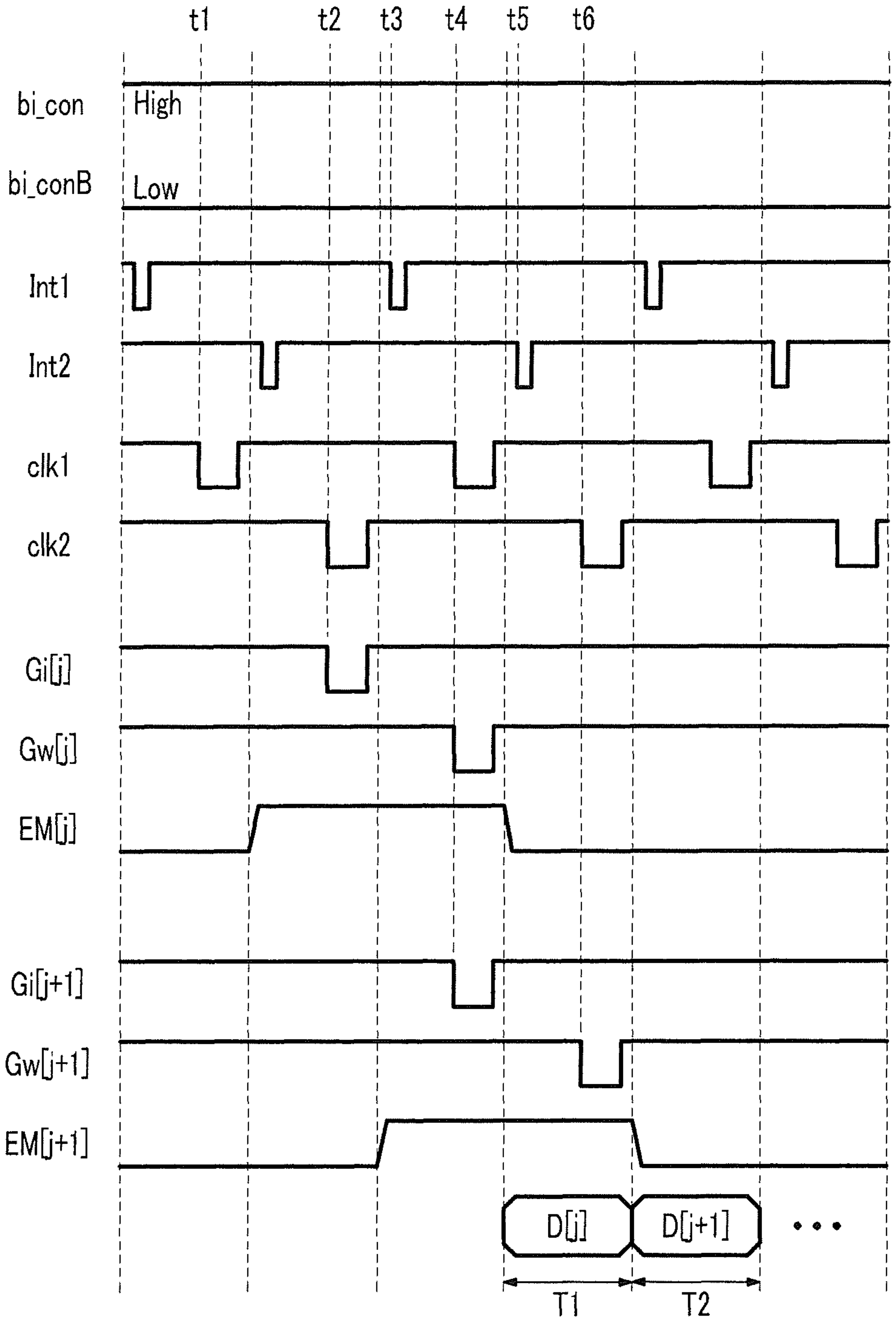
FIG. 6 is a driving signal waveform diagram according to forward direction driving of a scan driver according to an exemplary embodiment of the present invention.
Figure 7:
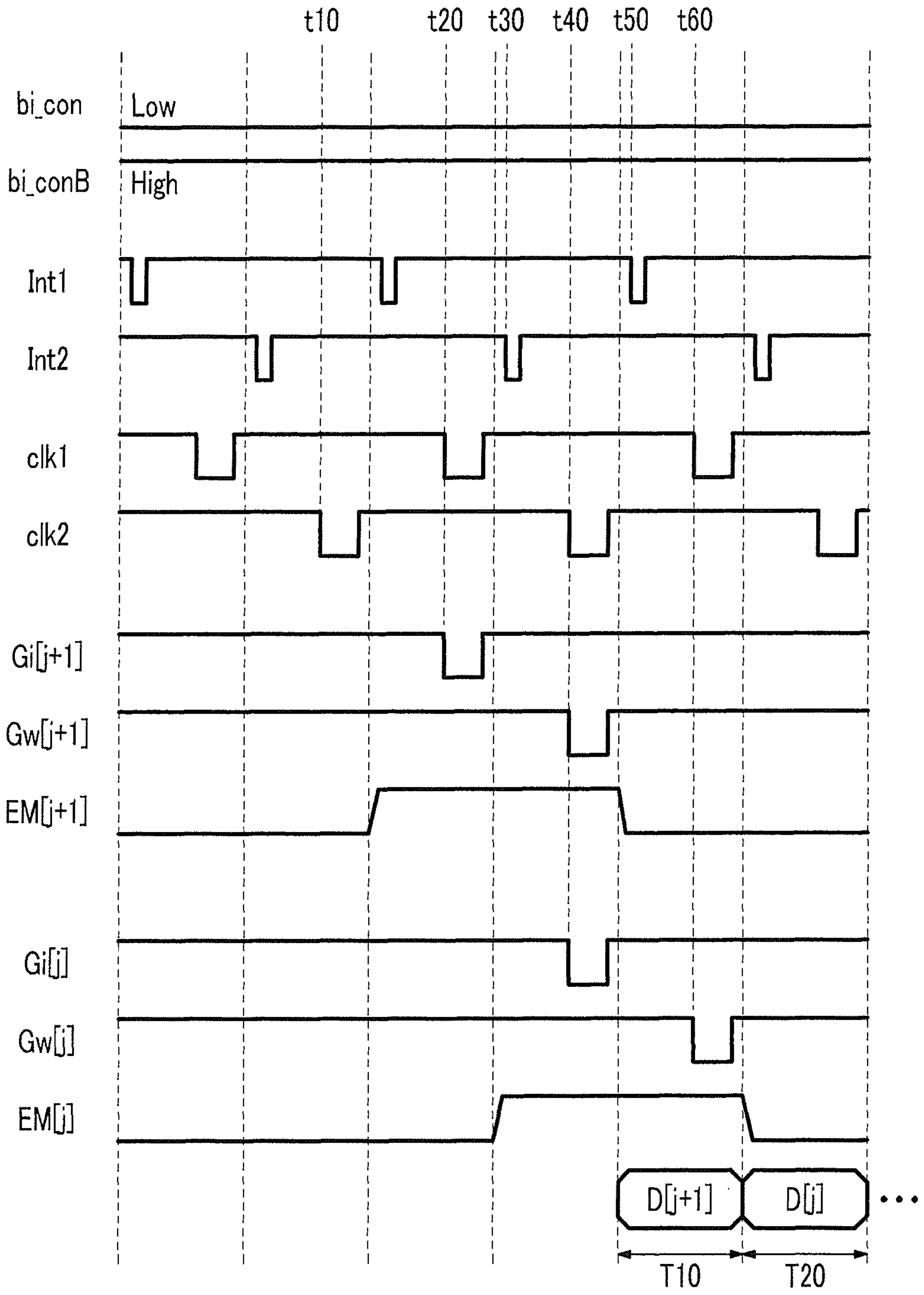
FIG. 7 is a driving signal waveform diagram according to backward direction driving of a scan driver according to an exemplary embodiment of the present invention.

Driving signal waveforms with which the scan driver of the exemplary embodiment of FIG. 5 is operated is shown in FIG. 6 and FIG. 7.

FIG. 6 is a driving signal waveform diagram according to forward direction driving of a scan driver according to an exemplary embodiment of the present invention, and FIG. 7 is a driving signal waveform diagram according to backward direction driving of a scan driver according to an exemplary embodiment of the present invention.

In FIG. 6 and FIG. 7, it is assumed that the times such as T1, T2, T10, and T20 each represent one horizontal period 1H, and in the signal waveforms of FIG. 6 and FIG. 7, the period of the first clock signal clk1, the period of the second clock signal clk2, the period of the first initialization signal Int1, and the period of the second initialization signal Int2 are respectively two horizontal periods.

Firstly, referring to FIG. 6 showing the signal waveforms according to the forward direction driving of the scan driver, the forward direction driving control signal bi_conB may have a low voltage level, and the backward direction driving control signal bi_con may have a high voltage level that is a reversed voltage of the forward direction driving control signal bi_conB during the period in which the scan driver is operated.

Accordingly, the first transistor P1 of the first shift register 301 that receives the forward direction driving control signal bi_conB is turned on, and the second transistor P2 of the first shift register 301 that receives the backward direction driving control signal bi_con is turned off.

The third transistor P3 is turned on when the first clock signal clk1 is transmitted as a low level pulse at the time t1, and the low voltage level of the first scan signal Gi[j−1] of the first shift register of the j−1 stage transmitted through the first transistor P1 is transmitted to the gate electrode of the seventh transistor P7. Accordingly, when the seventh transistor P7 is turned on at the time t2, the second clock signal clk2 is transmitted to the output terminal of the first shift register 301 through the seventh transistor P7 as the first scan signal Gi[j]. That is, the voltage level of the first scan signal Gi[j] transmitted to the plurality of pixels of the pixel line depends on the voltage level of the second clock signal clk2.

On the other hand, the first scan signal Gi[j−1] of the first shift register of the j−1 stage transmitted through the first transistor P1 during the time t1 to the time t2 is also concurrently (e.g., simultaneously) transmitted to the gate electrode of the fourth transistor P4 at the low voltage level.

Thus, the fourth transistor P4 is turned on such that the first power source voltage VGH is transmitted to the gate electrode of the eighth transistor P8, and the eighth transistor P8 is turned off. Thus, the first power source voltage VGH of the high voltage level is not output through the eighth transistor P8, and the signal Gi[j] at the output terminal of the first shift register 301 of the j stage follows the voltage level of the second clock signal clk2.

Next, the first initialization signal Int1 is transmitted as the low level pulse at the time t3 after the first scan signal Gi[j] of the first shift register 301 of the j stage is output.

In response to receiving the first initialization signal Int1, the sixth transistor P6 is turned on such that it transmits the second power source voltage VGL of the low voltage level to the node Q1.

The fifth transistor P5 and the eighth transistor P8 that are applied with the second power source voltage VGL of the low voltage level are turned on. Therefore, the first power source voltage VGH of the high voltage level is transmitted to the node Q2 through the fifth transistor P5, and the first power source voltage VGH of the high voltage level is transmitted to the output terminal as the first scan signal Gi[j] of the first shift register 301 of the j stage through the eighth transistor P8. Accordingly, the first scan signal Gi[j] at the output terminal is changed to the high level at the time t3. Here, the first power source voltage VGH transmitted to the node Q2 through the fifth transistor P5 is applied to the gate electrode of the seventh transistor P7 such that the seventh transistor P7 is turned off.

The second shift register 303 of the j stage receives the first scan signal Gi[j] from the output terminal of the first shift register 301 of the j stage as the input signal and is driven by a method substantially similar to the above described driving method of the first shift register 301.

That is, when the ninth transistor P9 is turned on according to the second clock signal clk2 transmitted as the low level pulse at the time t2, the first scan signal Gi[j] of the low voltage level is transmitted to the gate electrode of the thirteenth transistor P13 such that the thirteenth transistor P13 is turned on. Thus, the voltage level of the first clock signal clk1 is transmitted to the output terminal of the second shift register 303 of the j stage through the thirteenth transistor P13 at the time t4, and the voltage level of the first clock signal clk1 is the voltage level of the second scan signal Gw[j].

The first scan signal Gi[j] output from the first shift register 301 of the j stage and the second scan signal Gw[j] output from the second shift register 303 of the j stage have a phase difference by a period between the time t2 and the time t4, and are respectively transmitted to the first scan line and the second scan line of the j-th pixel line.

In FIG. 6, the phase difference between the first scan signal Gi[j] and the second scan signal Gw[j] is equal to half of a cycle (one horizontal cycle) of the first clock signal clk1 and the second clock signal clk2 and may be controlled according to the exemplary embodiment.

The plurality of pixels of the j-th pixel line are selected, and the light emission control signal EM[j] is maintained at the high level during the time when the first scan signal Gi[j] and the second scan signal Gw[j] are transmitted respectively through the first scan line and the second scan line of the j-th pixel line. The plurality of pixels are respectively initialized with the image data voltage stored according to the first scan signal Gi[j], and then are applied with the data voltage according to the image data signal that will be newly displayed according to the second scan signal Gw[j] during this period. During this period, the light emission control signal EM[j] is maintained at the high level such that light emitting is not executed. If the light emission control signal EM[j] is changed to the low level after the second scan signal Gw[j] is transmitted, the organic light emitting diode (OLED) of the corresponding pixels emits light corresponding to the applied data voltage.

On the other hand, in the scan driver according to an exemplary embodiment of the present invention driven in the forward direction, the first scan signal Gi[j] as the output terminal signal of the first shift register 301 of the j stage is transmitted as the input signal of the first shift register 401 of the j+1 stage as the next stage at the time t2. Here, the second clock signal clk2 of the low voltage level is concurrently (e.g., simultaneously) transmitted at the time t2 to the first shift register 401 of the j+1 stage such that the voltage level corresponding to the first clock signal clk1 is output as the first scan signal Gi[j+1] of the j+1 stage to the output terminal of the first shift register 401 of the j+1 stage at the time t4 through the same process as the above-described driving process.

Thus, the second shift register 403 of the j+1 stage receives the first scan signal Gi[j+1] of the j+1 stage as the input signal and outputs the second scan signal Gw[j+1] of the j+1 stage having the voltage level corresponding to the second clock signal clk2 at the time t6 through the same driving method as the second shift register 303 of the j stage.

FIG. 7 is a driving signal waveform diagram when driving a scan driver according to an exemplary embodiment of FIG. 5 in a backward direction.

In FIG. 7, each shift register included in the scan driver is operated according to substantially the same method as shown in FIG. 6 such that the detail description is omitted.

However, FIG. 7 shows the backward direction driving such that the backward direction driving control signal bi_con is at the low voltage level, and the forward direction driving control signal bi_conB is at the high voltage level that is opposite the low voltage level during a driving period. Accordingly, the first shift register of each stage receives the first scan signal of the lower stage as the input signal through the transistor that is turned on by the backward direction driving control signal bi_con.

Also, in the waveform diagram of FIG. 7, the first scan signal and the second scan signal are firstly generated through the shift register of the j+1 stage as the lower stage and are generated through the shift register of the j stage as the upper stage.

When the first shift register 401 of the j+1 stage is firstly driven such that the first scan signal Gi[j+1] of the j+1 stage is output at the time t20, the first scan signal Gi[j+1] of the j+1 stage is transmitted to the input terminal of the second shift register 403 of the j+1 stage such that the second scan signal Gw[j+1] of the j+1 stage is output at the time t40.

Also, in the backward direction driving method, the first scan signal Gi[j+1] of the j+1 stage is concurrently (e.g., simultaneously) transmitted to the input terminal of the first shift register 301 of the j stage at the time t20 such that the first scan signal Gi[j] of the j stage is output at the time t40.

Thus, the first scan signal Gi[j] of the j stage is transmitted to the input terminal of the second shift register 303 of the j stage at the time t40 such that the second scan signal Gw[j] of the j stage is output at the time t60.

The scan driver according to an exemplary embodiment of the present invention of FIG. 5 always firstly generates and outputs the first scan signal, and then generates and outputs the second scan signal regardless of whether the scan driver is driven in the forward direction or the backward direction as shown in the driving waveform diagrams of FIG. 6 and FIG. 7.

That is, the first scan signal is concurrently (e.g., simultaneously) transmitted to the first shift register of the previous stage or the next stage and the second shift register of the corresponding stage as the input signal such that the first scan signal of the previous stage or the next stage and the second scan signal of the corresponding stage are concurrently (e.g., simultaneously) generated.

Accordingly, the scan driver of an exemplary embodiment of the present invention may be driven according to the bi-directional driving method as described above such that the usage convenience of the display device of the bi-directional driving may be provided.

Figure 8:
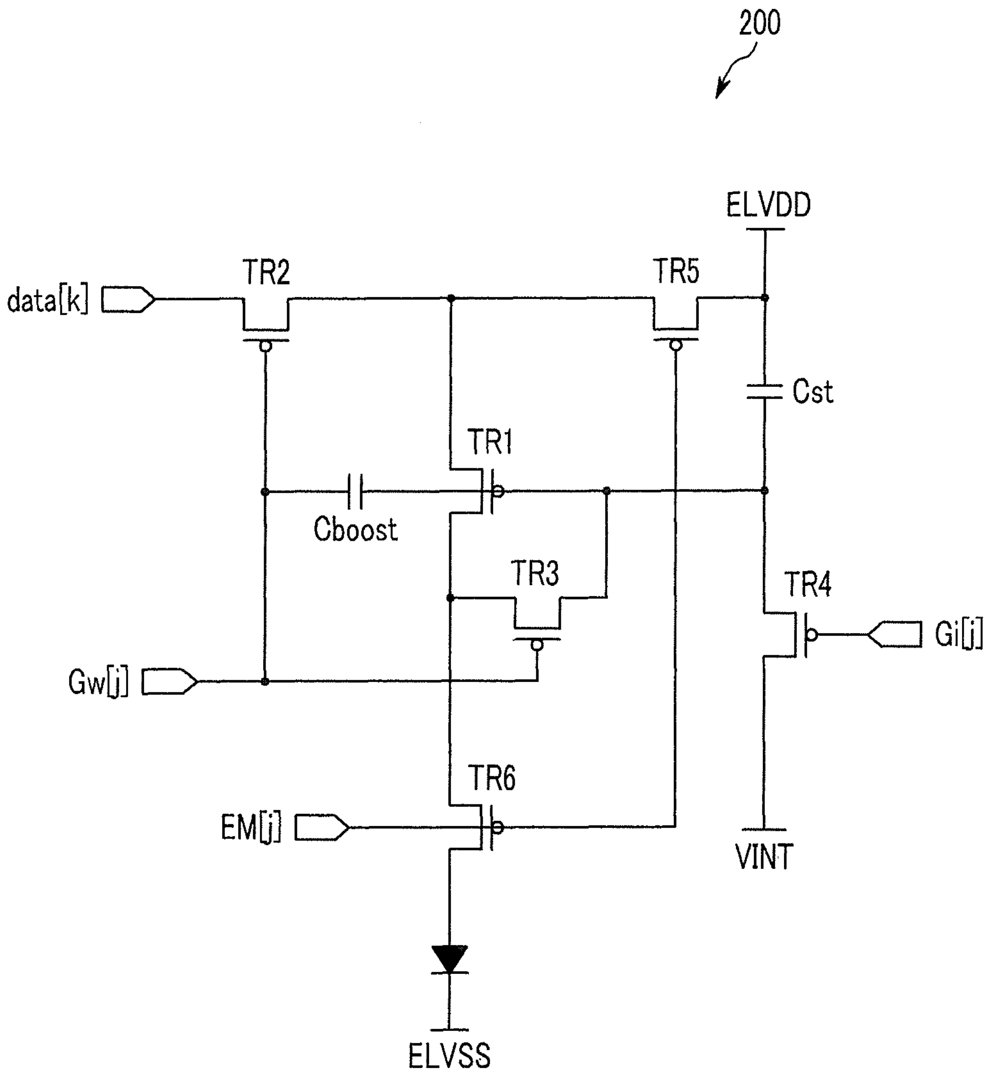
FIG. 8 is a circuit diagram of a pixel included in a display device according to an exemplary embodiment of the present invention.

FIG. 8 is a circuit diagram of a pixel of a display device according to an exemplary embodiment of the present invention. Particularly, FIG. 8 is a circuit diagram of a pixel included in the display device that is driven according to the scan signal transmitted from the scan driver 20' according to an exemplary embodiment of the present invention.

In FIG. 8, the pixel 200 is coupled to the first scan line Gi(j) and the second scan line Gw(j) that are coupled to the scan driver 20', and the light emission control line EM(j) that is coupled to the light emission control driver 40. The pixel 200 is also coupled to the k-th data line Dk among the plurality of data lines coupled to the data driver 30, and the pixel 200 is one example among the plurality of pixels included in the j-th pixel line of a plurality of pixel lines included in the display unit 10.

The circuit diagram shown in FIG. 8 is one exemplary embodiment, and the present invention is not limited thereto. Also, the plurality of transistors forming the pixel 200 are PMOS transistors, however they may be realized by NMOS transistors.

The pixel 200 of FIG. 8 includes an initialization transistor TR4 coupled between the initialization voltage VINT and a gate electrode of a driving transistor TR1, which is coupled between a source for supplying the driving power source voltage ELVDD and an anode of the organic light emitting diode (OLED), a switching transistor TR2 coupled between a source electrode of the driving transistor TR1 and a corresponding data line, and a light emission control transistor TR6 coupled between a drain electrode of the driving transistor TR1 and the anode of the organic light emitting diode (OLED).

In more detail, the initialization transistor TR4 transmits the initialization voltage VINT to the gate electrode of the driving transistor TR1 according to the first scan signal Gi[j] to initialize the voltage value of the gate electrode of the driving transistor TR1.

The switching operation of the switching transistor TR2 is controlled by the second scan signal Gw[j], and the switching transistor TR2 transmits the data signal data[k] to the driving transistor TR1 from the corresponding data line.

The pixel 200 of the present invention according to the exemplary embodiment of FIG. 8 may further include a switch TR3 coupled between the gate electrode and the drain electrode of the driving transistor TR1. The second scan signal Gw[j] is concurrently (e.g., simultaneously) transmitted to the gate electrodes of the switch TR3 and the switching transistor TR2, and the switch TR3 is operated according to the second scan signal Gw[j].

When the switch TR3 is turned on, the driving transistor TR1 is diode-connected to compensate for its threshold voltage.

Accordingly, the second scan signal Gw[j] is concurrently transmitted to the gate electrodes of the switching transistor TR2 and the switch TR3 that are switched according to the second scan signal Gw[j] such that the data signal is transmitted to the pixel 200 during the period in which the threshold voltage of the driving transistor TR1 is compensated for.

Thus, the driving transistor TR1 supplies the driving current corresponding to the data signal data[k] transmitted through the switching transistor TR2 to the organic light emitting diode (OLED).

The light emission control signal EM[j] is transmitted to the gate electrode of the light emission control transistor TR6, which is coupled between the drain electrode of the driving transistor TR1 and the anode of the organic light emitting diode (OLED), such that the driving current is supplied to the organic light emitting diode (OLED) to emit light corresponding to the data signal.

According to the exemplary embodiment of FIG. 8, a light emission control transistor TR5 may be further provided between the source for supplying the driving power source voltage ELVDD and the source electrode of the driving transistor TR1.

As described in the circuit diagram and the signal waveform diagram of the scan driver of FIG. 5 to FIG. 7, whether the driving direction of the scan driver is the forward direction or the backward direction, the first scan signal Gi[n] supplied to the light emission control transistor TR4 of the pixel 200 is transmitted earlier than the second scan signal Gw[n] supplied to the switching transistor TR2 and the switch TR3 of the pixel 200 such that the threshold voltage of the driving transistor TR1 is compensated for and the data signal may be transmitted, thereby displaying the images after the pixel 200 is always stably reset by the initialization voltage VINT.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

Description of Some of the Reference Numerals

| | | | |
|---|---|---|---|
| 10: | display unit | 20, 20': | scan driver |
| 30: | data driver | 40: | light emission control driver |
| 50: | signal controller | 60: | power source supply unit |
| 100: | display device | 200: | pixel |

What is claimed is:

1. A scan driver for generating and transmitting at least two different types of scan signals to a display unit including a plurality of pixels, the scan driver comprising a plurality of sequence drivers, each of the sequence drivers comprising a plurality of shift registers for generating the at least two different types of scan signals, wherein one of the scan signals includes an initialization signal generated in one of the shift registers that is transmitted as an input signal of a next one of the shift registers and as an input signal of a pixel from among the plurality of pixels coupled to the one of the shift registers, and the one of the scan signals including the initialization signal is concurrently transmitted as an input signal to the shift register of one of the sequence drivers of a previous stage or a next stage adjacent to one of the sequence drivers including the one of the shift registers in accordance with a driving direction of the scan driver, wherein each of the plurality of sequence drivers of a stage among a plurality of sequence drivers comprises:

a first shift register for receiving a forward direction start signal and the scan signal generated in the shift register of the sequence driver of the previous stage adjacent to the sequence driver of a corresponding stage, or the scan signal generated in the shift register of the sequence driver of the next stage adjacent to the sequence driver of the corresponding stage, and a backward direction start signal as a first input signal in synchronization with a first clock signal, and for outputting one of a second clock signal and a first power source voltage as a first scan signal respectively corresponding to the first input signal and a first initialization signal; and a second shift register for receiving the first scan signal as a second input signal in synchronization with the second clock signal and for outputting one of the first clock signal and the first power source voltage as a second scan signal respectively corresponding to the second input signal and a second initialization signal, wherein the first shift register comprises:

a first transistor configured to turn on according to the forward direction driving control signal and for transmitting the forward direction start signal and the scan signal generated in the shift register of the sequence driver of the previous stage adjacent to the sequence driver of the corresponding stage as the first input signal;

a second transistor configured to turn on according to the backward direction driving control signal and for transmitting the scan signal generated in the shift register of the sequence driver of the next stage adjacent to the sequence driver of the corresponding stage and the backward direction start signal as the first input signal;

a third transistor configured to turn on according to the first clock signal and for transmitting the first input signal from the first transistor or the second transistor;

a fourth transistor for receiving the first input signal from the first transistor or the second transistor, and configured to turn on according to a voltage level of the input signal, thereby transmitting the first power source voltage;

a fifth transistor configured to turn on according to the second power source voltage transmitted the fifth transistor according to the first initialization signal, and for transmitting the first power source voltage;

a sixth transistor configured to turn on according to the first initialization signal and for transmitting the second power source voltage to a first node coupled to a gate electrode of the fifth transistor;

a seventh transistor configured to turn on according to the voltage level of the input signal transmitted through the third transistor, and for outputting the second clock signal as the first scan signal; and an eighth transistor configured to turn on according to the second power source voltage transmitted to the first node, and for outputting the first power source voltage as the first scan signal.

2. The scan driver of claim 1, wherein when the driving direction is a forward direction, the scan signal is transmitted as the input signal to one of the shift registers of the one of the sequence drivers of the next stage adjacent to the sequence driver including the one of the shift registers, and when the driving direction is a backward direction, the scan signal is transmitted as the input signal to one of the shift registers of the one of the sequence drivers of the previous stage adjacent to the sequence driver including the one of the shift registers.

3. The scan driver of claim 1, wherein the at least two different types of scan signals comprise an initialization signal for initializing a gate voltage of a driving transistor included in the plurality of pixels, and a scan signal for controlling a switching operation of a switching transistor for transmitting the data signal corresponding to the plurality of pixels.

4. The scan driver of claim 3, wherein the initialization signal is generated and transmitted earlier than the scan signal.

5. The scan driver of claim 1, wherein the plurality of shift registers comprise:

a first shift register for generating an initialization signal for initializing a gate voltage of a driving transistor included in the plurality of pixels; and a second shift register for generating the scan signal for controlling a switching operation of a switching transistor for transmitting a data signal corresponding to the plurality of pixels.

6. The scan driver of claim 5, wherein the second shift register is configured to receive the initialization signal as the input signal to generate the scan signal by shifting the initialization signal by a first period.

7. The scan driver of claim 5, wherein the initialization signal is transmitted as the input signal to a first one of the shift registers of the sequence driver of the previous stage or the next stage adjacent to the sequence driver including the first one of the shift registers according to the driving direction of the scan driver in synchronization with a time that the initialization signal generated in the first one of the shift registers is transmitted as the input signal of a second one of the shift registers.

8. The scan driver of claim 7, wherein, when the driving direction is a forward direction, the initialization signal is transmitted as the input signal to the first one of the shift registers of the sequence driver of the next stage adjacent to the sequence driver including the first one of the shift registers, and when the driving direction is a backward direction, the initialization signal is transmitted as the input signal to the first one of the shift registers of the sequence driver of the previous stage adjacent to the sequence driver including the first one of the shift registers.

9. The scan driver of claim 1, wherein each of the plurality of sequence drivers of another stage among the plurality of sequence drivers comprises:

a first shift register for receiving the scan signal generated in the shift register of the sequence driver of the previous stage adjacent to the sequence driver of a corresponding stage, or the scan signal generated in the shift register of the sequence driver of the next stage adjacent to the sequence driver of the corresponding stage and a backward direction start signal as a third input signal in synchronization with a second clock signal, and for outputting one of a first clock signal and a first power source voltage as a first scan signal respectively corresponding to the third input signal and a second initialization signal; and a second shift register for receiving the first scan signal as a fourth input signal in synchronization with the first clock signal, and for outputting one of the second clock signal and the first power source voltage as a second scan signal respectively corresponding to the fourth input signal and a first initialization signal.

10. The scan driver of claim 1, wherein the second clock signal and the first clock signal have a phase difference of a half cycle.

11. The scan driver of claim 1, wherein:

the first initialization signal is generated in synchronization with the second clock signal or delayed; and the second initialization signal is generated in synchronization with the first clock signal or delayed.

12. The scan driver of claim 1, wherein a phase difference between the first scan signal and the second scan signal is same as a phase difference between the first clock signal and the second clock signal.

13. The scan driver of claim 1, wherein the first shift register further comprises:

a first capacitor including an electrode coupled to the first node and another electrode coupled to the first power source voltage; and a second capacitor including an electrode coupled to a gate electrode of the seventh transistor and another electrode coupled to an output terminal of the first shift register.

14. The scan driver of claim 1, wherein the second shift register comprises:

a ninth transistor configured to turn on according to the second clock signal and for transmitting the first scan signal;

a tenth transistor for receiving the first scan signal and configured to turn on according to a voltage level of the first scan signal, thereby transmitting the first power source voltage;

an eleventh transistor configured to turn on according to the second power source voltage transmitted to the eleventh transistor according to the second initialization signal, the eleventh transistor for transmitting the first power source voltage;

a twelfth transistor configured to turn on according to the second initialization signal and for transmitting the second power source voltage to a second node coupled to a gate electrode of the eleventh transistor;

a thirteenth transistor configured to turn on according to the voltage level of the first scan signal transmitted through the ninth transistor, and for outputting the first clock signal as the second scan signal; and a fourteenth transistor configured to turn on according to the second power source voltage transmitted to the second node, and for outputting the first power source voltage as the second scan signal.

15. The scan driver of claim 14, wherein the second shift register further comprises:

a third capacitor having an electrode coupled to the second node and another electrode coupled to the first power source voltage; and a fourth capacitor having an electrode coupled to a gate electrode of the thirteenth transistor and another electrode coupled to an output terminal of the second shift register.

16. The scan driver of claim 9, wherein the first shift register comprises:

a first switch configured to turn on according to a forward direction driving control signal and for transmitting the scan signal generated in the shift register of the sequence driver of the previous stage adjacent to the sequence driver of the corresponding stage as the third input signal;

a second switch configured to turn on according to the backward direction driving control signal and for transmitting the scan signal generated in the shift register of the sequence driver of the next stage adjacent to the sequence driver of the corresponding stage and the backward direction start signal as the third input signal;

a third switch configured to turn on according to the second clock signal and for transmitting the third input signal from the first switch or the second switch;

a fourth switch for receiving the third input signal and configured to turn on according to a voltage level of the third input signal, thereby transmitting the first power source voltage;

a fifth switch configured to turn on according to the second power source voltage transmitted to the fifth switch according to the second initialization signal, the fifth switch for transmitting the first power source voltage;

a sixth switch configured to turn on according to the second initialization signal and for transmitting the second power source voltage to a third node coupled to a gate electrode of the fifth switch;

a seventh switch configured to turn on according to the voltage level of the third input signal transmitted through the third switch and for outputting the first clock signal as the first scan signal; and an eighth switch configured to turn on according to the second power source voltage transmitted to the third node, and for outputting the first power source voltage as the first scan signal.

17. The scan driver of claim 16, wherein the first shift register further comprises:

a fifth capacitor including an electrode coupled to the third node and another electrode coupled to the first power source voltage; and a sixth capacitor including an electrode coupled to a gate electrode of the seventh switch and another electrode coupled to an output terminal of the first shift register.

18. The scan driver of claim 9, wherein the second shift register comprises:

a ninth switch configured to turn on according to the first clock signal and for transmitting the first scan signal;

a tenth switch for receiving the first scan signal and configured to turn on according to a voltage level of the first scan signal, thereby transmitting the first power source voltage;

an eleventh switch configured to turn on according to the second power source voltage transmitted to the eleventh switch according to the first initialization signal, the eleventh switch for transmitting the first power source voltage;

a twelfth switch configured to turn on according to the first initialization signal and for transmitting the second power source voltage to a fourth node coupled to a gate electrode of the eleventh switch;

a thirteenth switch configured to turn on according to the voltage level of the first scan signal transmitted through the ninth switch, and for outputting the second clock signal as the second scan signal; and a fourteenth switch configured to turn on according to the second power source voltage transmitted to the fourth node and for outputting the first power source voltage as the second scan signal.

19. The scan driver of claim 18, wherein the second shift register further comprises:

a seventh capacitor having an electrode coupled to the fourth node and another electrode coupled to the first power source voltage; and an eighth capacitor having an electrode coupled to a gate electrode of the thirteenth switch and another electrode coupled to an output terminal of the second shift register.

20. A display device comprising:

a display unit including a plurality of pixels;

a scan driver for transmitting at least two different types of scan signals to the plurality of pixels;

a data driver for transmitting a data signal to the plurality of pixels;

a light emission control driver for transmitting a light emission control signal to the plurality of pixels; and a signal controller for generating and transmitting a plurality of control signals for controlling the scan driver, the data driver, and the light emission control driver, wherein the scan driver comprises a plurality of sequence drivers, each of the sequence drivers comprising a plurality of shift registers for generating the at least two different types of scan signals, and wherein one of the scan signals includes an initialization signal-generated in one of the shift registers that is transmitted as an input signal of a next one of the shift registers and as an input signal of a pixel from among the plurality of pixels coupled to the one of the shift registers, and the one of the scan signals including the initialization signal is concurrently transmitted to the shift register of one of the sequence drivers of a previous stage or a next stage adjacent to the one of the sequence drivers including the one of the shift registers as the input signal according to a driving direction of the scan driver, wherein each of the plurality of sequence drivers of a stage among a plurality of sequence drivers comprises:

a first shift register for receiving a forward direction start signal and the scan signal generated in the shift register of the sequence driver of the previous stage adjacent to the sequence driver of a corresponding stage, or the scan signal generated in the shift register of the sequence driver of the next stage adjacent to the sequence driver of the corresponding stage, and a backward direction start signal as a first input signal in synchronization with a first clock signal, and for outputting one of a second clock signal and a first power source voltage as a first scan signal respectively corresponding to the first input signal and a first initialization signal; and a second shift register for receiving the first scan signal as a second input signal in synchronization with the second clock signal and for outputting one of the first clock signal and the first power source voltage as a second scan signal respectively corresponding to the second input signal and a second initialization signal, wherein the first shift register comprises:

a first transistor configured to turn on according to the forward direction driving control signal and for transmitting the forward direction start signal and the scan signal generated in the shift register of the sequence driver of the previous stage adjacent to the sequence driver of the corresponding stage as the first input signal;

a second transistor configured to turn on according to the backward direction driving control signal and for transmitting the scan signal generated in the shift register of the sequence driver of the next stage adjacent to the sequence driver of the corresponding stage and the backward direction start signal as the first input signal;

a third transistor configured to turn on according to the first clock signal and for transmitting the first input signal from the first transistor or the second transistor;

a fourth transistor for receiving the first input signal from the first transistor or the second transistor, and configured to turn on according to a voltage level of the input signal, thereby transmitting the first power source voltage;

a fifth transistor configured to turn on according to the second power source voltage transmitted the fifth transistor according to the first initialization signal, and for transmitting the first power source voltage;

a sixth transistor configured to turn on according to the first initialization signal and for transmitting the second power source voltage to a first node coupled to a gate electrode of the fifth transistor;

a seventh transistor configured to turn on according to the voltage level of the input signal transmitted through the third transistor, and for outputting the second clock signal as the first scan signal; and an eighth transistor configured to turn on according to the second power source voltage transmitted to the first node, and for outputting the first power source voltage as the first scan signal.

21. The display device of claim 20, wherein the signal controller is configured to generate and transmit a forward direction driving control signal and a backward direction driving control signal for determining the driving direction of the scan driver.

22. The display device of claim 21, wherein the forward direction driving control signal and the backward direction driving control signal are inverted signals.

23. The display device of claim 20, wherein, when the driving direction is a forward direction, the scan signal is transmitted as the input signal to one of the shift registers of the one of the sequence drivers of the next stage adjacent to the sequence driver including the one of the shift registers, and when the driving direction is a backward direction, the scan signal is transmitted as the input signal to one of the shift registers of the one of the sequence drivers of the previous stage adjacent to the sequence driver including the one of the shift registers.

24. The display device of claim 20, wherein the at least two different types of scan signals comprise an initialization signal for initializing a gate voltage of a driving transistor included in the plurality of pixels, and a scan signal for controlling a switching operation of a switching transistor for transmitting the data signal corresponding to the plurality of pixels.

25. The display device of claim 24, wherein the initialization signal is generated and transmitted earlier than the scan signal.

26. The display device of claim 20, wherein the plurality of shift registers comprise:

a first shift register for generating an initialization signal for initializing a gate voltage of a driving transistor included in the plurality of pixels; and a second shift register for generating the scan signal for controlling a switching operation of a switching transistor for transmitting a data signal corresponding to the plurality of pixels.

27. The display device of claim 26, wherein the second shift register is configured to receive the initialization signal as the input signal to generate the scan signal by shifting the initialization signal by a first period.

28. The display device of claim 26, wherein the initialization signal is transmitted as the input signal to a first one of the shift registers of the sequence driver of the previous stage or the next stage adjacent to the sequence driver including the first one of the shift registers according to the driving direction of the scan driver in synchronization with a time that the initialization signal generated in the first one of the shift registers is transmitted as the input signal of a second one of the shift registers.

29. The display device of claim 28, wherein, when the driving direction is a forward direction, the initialization signal is transmitted as the input signal to the first one of the shift registers of the sequence driver of the next stage adjacent to the sequence driver including the first one of the shift registers, and when the driving direction is a backward direction, the initialization signal is transmitted as the input signal to the first one of the shift registers of the sequence driver of the previous stage adjacent to the sequence driver including the first one of the shift registers.

* * * * *